US009068537B2

(12) United States Patent
Khami et al.

(10) Patent No.: US 9,068,537 B2
(45) Date of Patent: Jun. 30, 2015

(54) INTAKE SYSTEM INCLUDING REMOTELY LOCATED FILTER ASSEMBLIES AND METHOD FOR OPERATION OF AN INTAKE SYSTEM

(71) Applicant: Ford Global Technologies, LLC, Dearborn, MI (US)

(72) Inventors: Roger Khami, Troy, MI (US); Preet Kamal Virk, Canton, MI (US); Robert Joseph Mohan, Canton, MI (US); Joseph Matthew McCann, Plymouth, MI (US); James William Ortman, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 13/841,327

(22) Filed: Mar. 15, 2013

(65) Prior Publication Data

US 2014/0150655 A1 Jun. 5, 2014

Related U.S. Application Data

(60) Provisional application No. 61/733,733, filed on Dec. 5, 2012.

(51) Int. Cl.

| | |
|---|---|
| ***B01D 46/10*** | (2006.01) |
| ***F02M 35/04*** | (2006.01) |
| ***F02M 35/024*** | (2006.01) |
| ***F02M 35/02*** | (2006.01) |

(52) U.S. Cl.
CPC ... *F02M 35/02483* (2013.01); *F02M 35/02441* (2013.01); *F02M 35/0215* (2013.01)

(58) Field of Classification Search
USPC ........ 55/385.3, 320, 484, 497, 502, 343, 485, 55/486, 498, 529, 472, 482, DIG. 31; 123/54.4, 198 E; 180/219
See application file for complete search history.

(56) References Cited

U.S. PATENT DOCUMENTS

| | | | | |
|---|---|---|---|---|
| 5,391,212 | A * | 2/1995 | Ernst et al. | 55/385.3 |
| 7,601,189 | B2 * | 10/2009 | Lampinen et al. | 55/385.3 |
| 8,062,397 | B2 * | 11/2011 | Lin et al. | 55/320 |
| 8,147,578 | B2 * | 4/2012 | Bannister et al. | 55/385.3 |
| 8,211,197 | B2 * | 7/2012 | Srinivasan et al. | 55/385.3 |
| 8,241,382 | B2 * | 8/2012 | Pham et al. | 55/484 |
| 8,277,163 | B2 * | 10/2012 | Murata et al. | 414/282 |
| 8,425,645 | B2 * | 4/2013 | Pham et al. | 55/484 |
| 8,663,351 | B2 * | 3/2014 | Koch | 55/320 |
| 8,734,556 | B2 * | 5/2014 | Srinivasan et al. | 55/385.3 |
| 2001/0005984 | A1 * | 7/2001 | Knodler et al. | 55/385.3 |
| 2002/0033010 | A1 * | 3/2002 | Schorn | 55/385.3 |
| 2004/0187453 | A1 * | 9/2004 | Kuji et al. | 55/385.3 |
| 2005/0051375 | A1 * | 3/2005 | Momosaki | 180/219 |
| 2005/0235833 | A1 * | 10/2005 | Sassa et al. | 96/417 |
| 2007/0289268 | A1 * | 12/2007 | Smith | 55/385.3 |
| 2009/0241868 | A1 * | 10/2009 | Morita et al. | 123/54.4 |
| 2011/0023427 | A1 * | 2/2011 | Srinivasan et al. | 55/385.3 |

* cited by examiner

*Primary Examiner* — Duane Smith
*Assistant Examiner* — Minh-Chau Pham
(74) *Attorney, Agent, or Firm* — Julia Voutyras; Alleman Hall McCoy Russell & Tuttle LLP

(57) ABSTRACT

An intake system for an engine including a first air filter assembly in fluidic communication with an intake manifold and a second air filter assembly spaced away from the first air filter assembly and in fluidic communication with the intake manifold.

21 Claims, 2 Drawing Sheets

INTAKE SYSTEM INCLUDING REMOTELY LOCATED FILTER ASSEMBLIES AND METHOD FOR OPERATION OF AN INTAKE SYSTEM

CROSS REFERENCE TO RELATED APPLICATION

The present application claims the benefit of and priority to U.S. Provisional Patent Application No. 61/733,733, filed Dec. 5, 2012, the content of which is incorporated herein by reference for all purposes.

FIELD

The present disclosure relates to an air intake system for an internal combustion engine of a vehicle.

BACKGROUND AND SUMMARY

Internal combustion engines need a supply of air for combustion operation. The air may be filtered to reduce the number of particulates in the intake air. However, air filters may become clogged or otherwise obstructed due to environmental conditions outside of the engine or vehicle. This may be particularly problematic during extreme weather conditions (e.g., snow storms, dust storms, etc.) For example, falling snow may enter an engine air filter, obstructing the intake airflow. As a result, the airflow through the intake system may be substantially reduced, thereby negatively affecting combustion performance and engine efficiency.

Secondary or auxiliary air filters adjacent to a primary air filter have been developed in an attempt to provide a desired amount of filtered air to the engine during extreme weather conditions. For example, U.S. Pat. No. 8,211,197 discloses a filter assembly having a primary air filter and an auxiliary air filter positioned in a single filter mount.

The inventors have recognized several drawbacks with the filter assembly disclosed in U.S. Pat. No. 8,211,197. The size and profile of the air filter assembly is increased when both the primary and secondary air filter are integrated into the same mounting structure. Consequently, it may be difficult to position a large air filter assembly in desired positions in the vehicle, such as the engine compartment, due to packaging constraints. Moreover, when the primary and secondary filters are positioned in a common location in the vehicle, both of the filters may become clogged with the same type of particulates due to their proximal locations despite attempts to segregate their flows.

The inventors herein have recognized the above issues and developed an intake system for an engine including a first air filter assembly in fluidic communication with an intake manifold and a second air filter assembly spaced away from the first air filter assembly and in fluidic communication with the intake manifold.

In this way, the first air filter assembly may be positioned at a remote location from the second air filter assembly, enabling the air filters to be positioned in desired locations in the vehicle that will decrease the overall profile of the intake system as well as provide protection from particulate matter and other external elements such as road debris. Moreover, the spacing the filter assemblies apart decreases the likelihood of both of the filters becoming clogged by similar particulate matter (e.g., snow, dust, etc.) from the surrounding environment.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

DETAILED DESCRIPTION

An intake system having two air filters assemblies is described herein. The air filter assemblies may be remotely located and spaced away from one another. Furthermore, the air filter assemblies are in parallel fluidic communication. The spacing of the air filter assemblies increases the intake system robustness and decreased the likelihood of both of the air filter becoming damage via external elements, such as road debris. Additionally, spacing the filter assemblies apart decreases the likelihood of both of the filters becoming clogged by similar particulate matter (e.g., snow, dust, etc.) from the surrounding environment.

Figure 1:
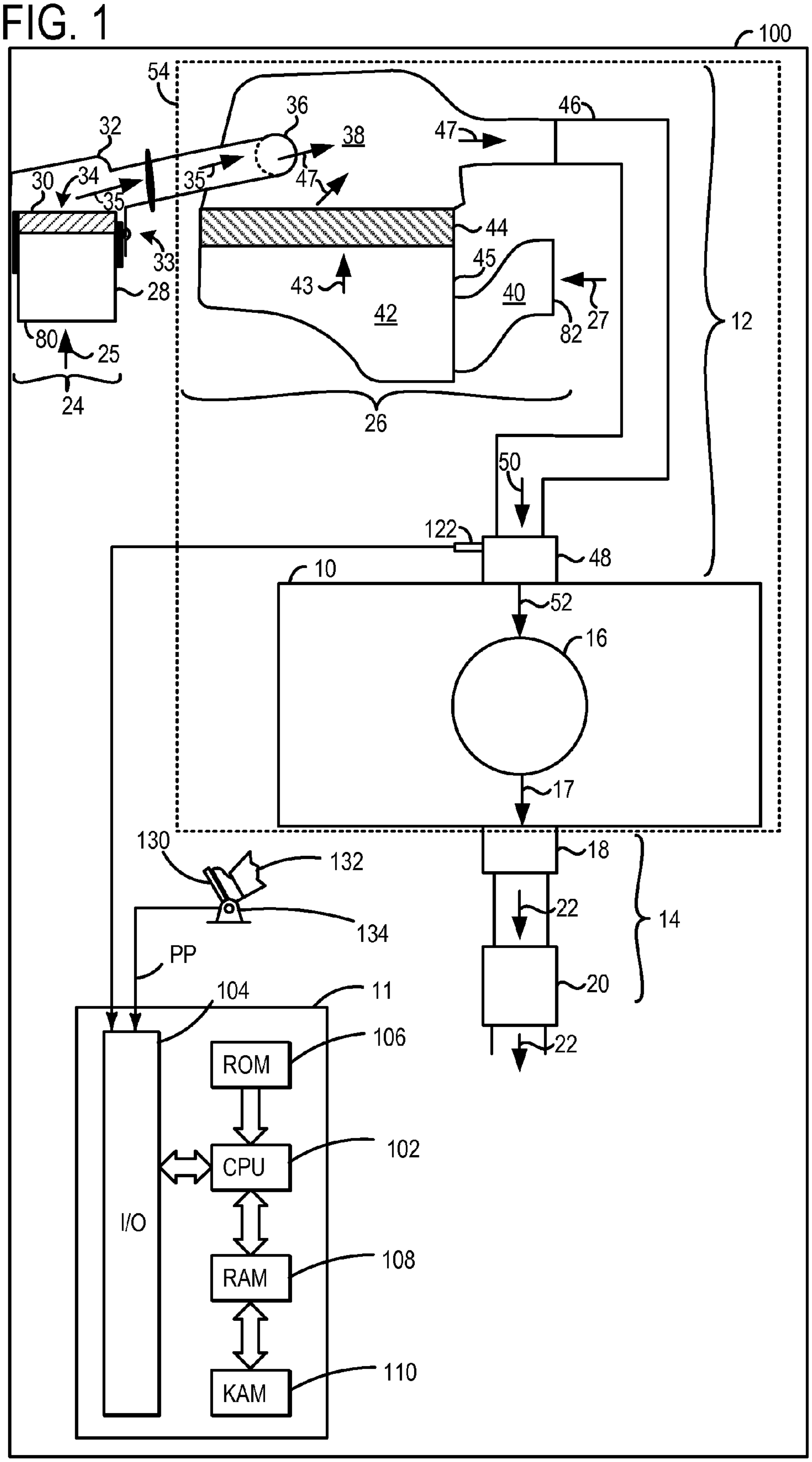
FIG. 1 shows a vehicle including an engine, intake system, and exhaust system.

FIG. 1 shows an engine 10 and intake system 12 and exhaust system 14. The engine 10 may provide motive power to a vehicle 100. The engine 10 includes at least one cylinder 16. The engine 10 may be configured to perform combustion operation in the cylinder, such as a four stroke combustion cycle where in intake stroke, a compression stroke, a power stroke, and an exhaust stoke are executed. The cylinder 16 may include at least one intake valve (not shown) and exhaust valve (not shown) coupled thereto to facilitate the aforementioned four stroke operation. Compression and/or spark ignition in any desirable variant may also be used to perform combustion.

Arrow 17 depicts the general flow of exhaust gas from the cylinder 16 to the exhaust system 14. The exhaust system 14 may include an exhaust manifold 18 in fluidic communication with the cylinder 16. The exhaust system 14 may further include an emission control device 20 such as a catalyst, exhaust filter, etc. The exhaust gas may flow to the surrounding environment downstream of the emission control device 20. Arrows 22 depict the general flow of exhaust gas through the exhaust system 14. However, it will be appreciated that the flow may have additional complexity that is not depicted.

The intake system 12 includes a first air filter assembly 24 and a second air filter assembly 26. Arrow 25 depicts the airflow into the first air filter assembly 24 and arrow 27 generally depicts airflow into the second air filter assembly 26. As shown, the first air filter assembly 24 is spaced away from the second air filter assembly 26. Therefore, the first air filter assembly 24 and the second air filter assembly 26 do not share a common housing, housing body, filter mount, etc., in the depicted example. When the air filter assemblies are positioned in this way the air filters may be positioned in such a way to reduce the overall profile of the intake system while at the same time provide a back-up air filter which may enable a desired amount of intake air to be supplied to the engine when the main air filter is not functioning as desired (e.g., clogged or otherwise obstructed). Consequently, desired packaging objectives in the vehicle may be achieved. Moreover, positioning the air filters at remote locations reduces the likelihood of both the air filter assemblies becoming clogged with particulate matter.

The first air filter assembly 24 includes porous foam 28 or other suitable porous material and a filter element 30. As shown, the porous foam spans a leading side of the filter element. However, porous foam and filter element positions, geometries, contours, etc., have been contemplated. The porous foam 28 and the filter element 30 may comprise different materials. Additionally, the porous foam and the filter element may be of unequal size and/or shape. For instance, the porous foam is larger in size than the filter element. Arrow 25 denotes the general flow of intake air into the first air filter assembly 24 and specifically the porous foam 28. The porous foam 28 may span the filter element 30 in a direction perpendicular to the general flow direction of gas through the filter element, in some examples. Further, the porous foam 28 may be positioned vertically below the filter element 30. As a result, the likelihood of snow, dust, and/or other particulates clogging and/or obstructing the first air filter assembly is reduced. However, other relative positions of the porous foam and the filter element have been contemplated.

In some examples, the first air filter assembly 24 may have a removable cover positioned over the porous foam 28. The cover may substantially inhibit airflow into the first air filter assembly 24. The cover may be removed when the second air filter assembly 26 is clogged or otherwise degraded. Further in some examples, the removable cover may be removed or opened via a cover actuation device controlled by the controller 11. In other examples, the removable cover may be manually removed. However, in other examples the first air filter assembly 24 may not include a removable cover.

The first air filter assembly 24 is removably coupled to a connector duct 32. A quick coupling apparatus 33 enabling the removable coupling of the aforementioned components is discussed in greater detail herein with regard to FIG. 2. In this way, the first air assembly may be easily installed or removed for repair or replacement. Portions of the connector duct 32 may also be removably coupled to one another, if desired. In this way, installation, repair, and/or replacement may be simplified. The connector duct 32 includes an inlet 34 in direct fluidic communication with the first air filter assembly 24. Arrows 35 denote the general flow of filtered air through the connector duct 32. Additionally, the connector duct 32 includes an outlet 36 in direct fluidic communication with a filtered air compartment 38 included in the second air filter assembly 26. The filtered air compartment 38 is included in the second air filter assembly 26. Thus, filtered air from the first air filter assembly 24 may merge with filtered air in filtered air compartment 38 in the second air filter assembly 26. However, in other examples the connector duct 32 may be coupled to an intake conduit 46 or an intake manifold 48.

The second air filter assembly 26 further includes an intake duct 40. The intake duct 40 may receive air from the surrounding environment. The intake duct 40 is in direct fluidic communication with an unfiltered air compartment 42. Arrow 43 depicts the general direction of airflow through the unfiltered air compartment 42. A filter element 44 is positioned downstream of the unfiltered air compartment 42. The filter element 44 is included in the second air filter assembly 26. The second air filter assembly 26 further includes the filtered air compartment 38 positioned downstream (e.g., directly downstream) of the filter element 44. Directly downstream infers that there are no intervening components, parts, etc., between the elements. The filter element 44 may span a housing 45 of the second air filter assembly 26. In this way, all of the air passing through the air assembly may be filtered via the filter element 44. The housing 45 may define sections of the second air filter assembly 26 such as the intake duct 40, the unfiltered air compartment 42, and the filtered air compartment 38.

In some examples, the filter element 44 and the filter element 30 may comprise different materials. In this way, each of the air filter assemblies may have different filtering characteristics, if desired. Further in some examples, the filter element 30 may have a smaller cross-sectional area than the filter element 44. The cross-sectional area may be measured across a plane perpendicular to the general direction of gas flow through each respective filter element.

The filter element 44 is positioned upstream of the filtered air compartment 38 and therefore provides filtered air to the filtered air compartment 38. Arrows 47 depict the general direction of airflow in the filtered air compartment. The filtered air compartment 38 is directly coupled to the intake conduit 46. Thus, the filtered air compartment 38 and more generally the second air filter assembly 26 is in fluidic communication with the intake conduit 46. The intake conduit 46 is in fluidic communication with the intake manifold 48. Arrow 50 depicts the general flow of exhaust gas through the intake conduit 46. The intake manifold 48 is configured to provide intake air to the cylinder 16. Arrow 52 depicts the flow of intake air from the intake manifold 48 to the cylinder 16. In some examples, a vector normal to an inlet face 80 of the first air filter assembly 24 is not parallel with a vector normal to an inlet face 82 of the second air filter assembly 26. Additionally in some examples, the inlet face 80 of the first air filter assembly may face downward and is approximately parallel with a filter in the first air filter assembly, and the inlet face 82 of the second air filter assembly faces approximately horizontal and perpendicular to the inlet face 80 of the first air filter assembly.

An engine compartment 54 may also be included in the vehicle 100, in one example. In such an example the first air filter assembly 24 may be positioned outside of (e.g., external to) the engine compartment 54 and the second air filter assembly 26 may be positioned within the engine compartment 54. However, in other examples both the first air filter assembly 24 and the second air filter assembly 26 may be positioned within the engine compartment 54 adjacent to one another. Additionally, the engine 10 may be positioned within the engine compartment 54. However, in other examples both the first air filter assembly 24 and the second air filter assembly 26 may be positioned in the engine compartment 54 and spaced away from one another. Still in other examples, both the first air filter assembly 24 and the second air filter assembly 26 may be positioned outside of the engine compartment 54. Additionally, the air filter assemblies may be referred to as air filter boxes and may generally be included in an air cleaner system.

The engine 10 and the intake system 12 and exhaust system 14 may be controlled at least partially by a control system including controller 11 and by input from a vehicle operator 132 via an input device 130. In this example, input device 130 includes an accelerator pedal and a pedal position sensor 134 for generating a proportional pedal position signal PP.

Controller 11 is shown in FIG. 1 as a microcomputer, including microprocessor unit 102, input/output ports 104, an electronic storage medium for executable programs and calibration values shown as read only memory 106 (e.g., memory chip) in this particular example, random access memory 108, keep alive memory 110, and a data bus. Controller 11 may receive various signals from sensors coupled to engine 10. For example, the controller 11 may receive an absolute manifold pressure signal, MAP, from sensor 122, or alternatively a mass airflow from a MAF sensor. Manifold pressure signal MAP or flow signal MAF may be used to provide an indication of vacuum, or pressure, in the intake manifold.

Figure 2:
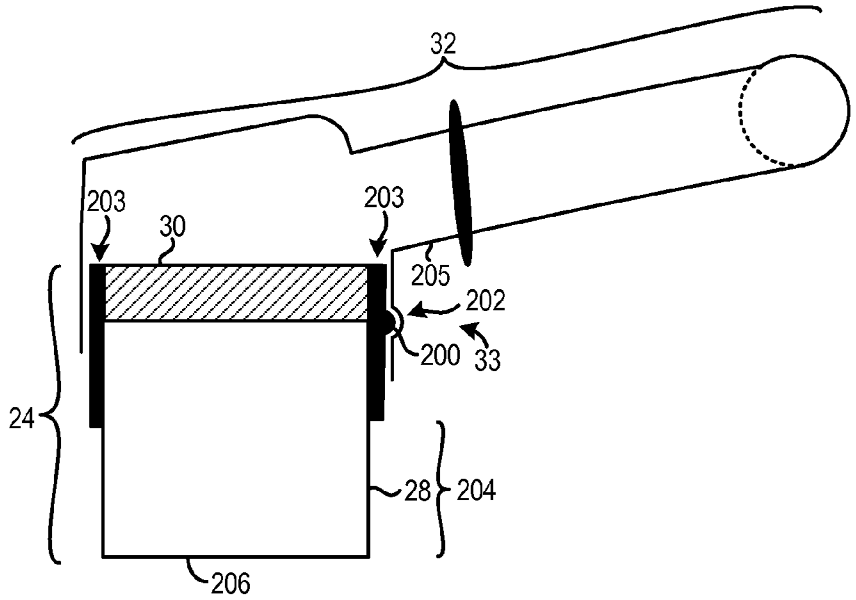
FIG. 2 shows an expanded view of a first air filter assembly in the intake system shown in FIG. 1.

FIG. 2 shows an enlarged view of the first air filter assembly 24. As shown, the first air filter assembly 24 includes the quick coupling apparatus 33 configured to attach to the housing of the connector duct 32. The quick coupling apparatus 33 include a protrusion 200. As shown, the protrusion 200 is curved. However, other protrusion geometries have been contemplated. The protrusion may be included in a housing 203 of the first air filter assembly 24. The housing may at least partially enclose the filter element 30 and/or the porous foam 28. As shown, a portion 204 of the porous foam 28 is not enclosed by the housing 203. However, in other examples, the housing may extend to a leading side 206 of the porous foam 28.

The protrusion 200 is shaped and sized to mate with a recess 202 in the housing 205 of the connector duct 32. In the coupled configuration shown in FIG. 2 the protrusion 200 is mated with the recess 202. Specifically, in the coupled configuration the protrusion 200 may be in face sharing contact with the recess 202. To uncouple the recess 202 may be bent or otherwise moved away from the protrusion to enable the first air filter assembly 24 to be removed from the connector duct 32. The portion of the housing 205 including the recess 202 may comprise a flexible material such as a bendable plastic, metal, etc., enabling the first air filter assembly 24 to be removed from the connector duct 32. It will be appreciated that other types of quick coupling apparatuses have been contemplated such a threaded attachment or other suitable apparatuses enabling quick coupling and uncoupling. Additional or alternative coupling apparatuses such as bolts, adhesive, screws, may be used to couple the first air filter assembly 24 to the connector duct 32 in some examples if desired.

Figure 3:
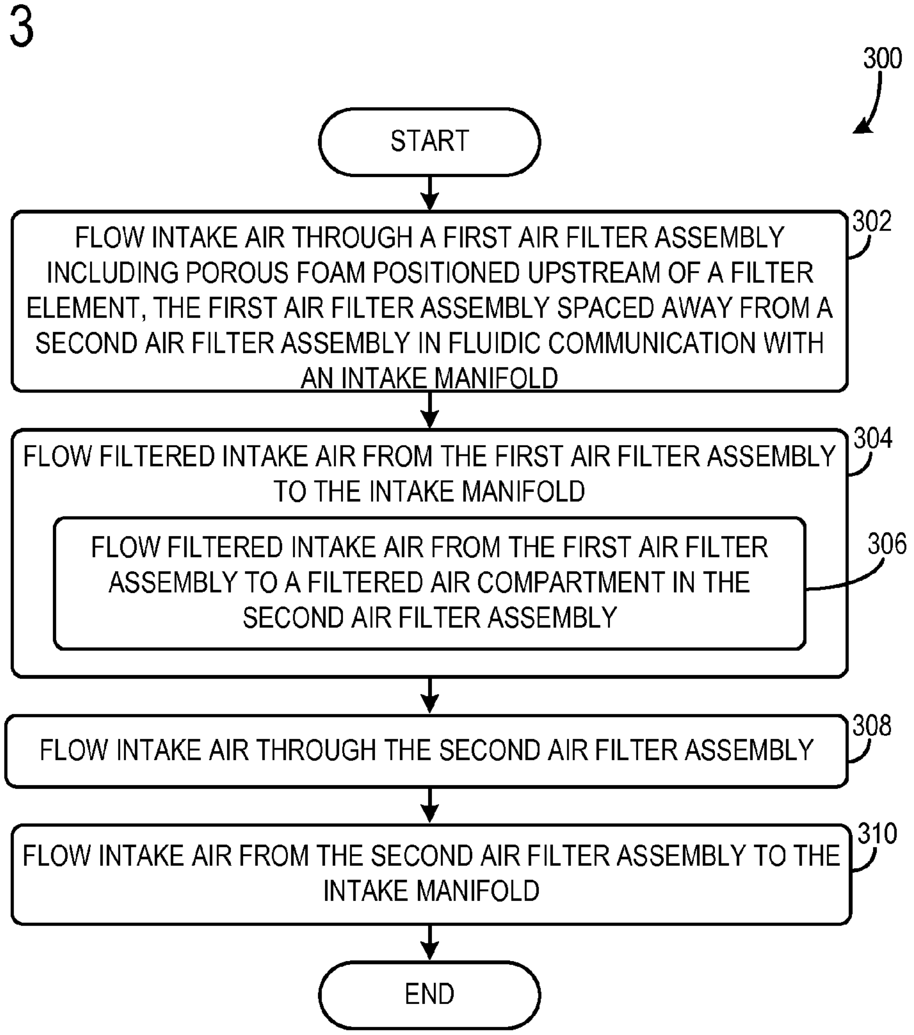
FIG. 3 shows a method for operation of an intake system for an engine.

FIG. 3 shows a method 300 for operation an intake system for an engine. Method 300 may be implemented by the engine and intake system discussed above with regard to FIGS. 1 and 2 or may be implemented by another suitable engine and intake system.

At 302 the method includes flowing intake air through a first air filter assembly including porous foam positioned upstream of a filter element, the first air filter assembly spaced away from a second air filter assembly in fluidic communication with an intake manifold.

Next at 304 the method includes flowing filtered intake air from the first air filter assembly to the intake manifold. Flowing filtered intake air from the first air filter assembly to the intake manifold may include at 306 flowing filtered intake air from the first air filter assembly to a filtered air compartment in the second air filter assembly. At 308 the method includes flowing intake air through the second air filter assembly and at 310 the method includes flowing intake air from the second air filter assembly to the intake manifold. In some examples, the filter element may have a smaller cross-sectional area perpendicular to the direction of air flow through the filter than a second filter element included in the second air filter assembly.

Method 300 enables intake air to be flowed through both the first and second air filter assemblies. Therefore, when the flowrate of intake air decreases in one of the filters, due to filter contamination, the other filter may provide intake air at a higher flowrate, thereby increasing the efficiency of the intake system as well as combustion efficiency.

In some examples, the configuration may depend on the type of intake sensors, such as MAF or MAP. In systems including a MAF sensor, the quick disconnect connection described in FIG. 2 may be provided at the cover. Alternatively, without a MAF sensor, the quick disconnect connection described in FIG. 2 may be provided at the duct.

Note that the example routines included herein can be used with various engine and/or vehicle system configurations. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An intake system for an engine comprising:

a first air filter assembly in fluidic communication with an intake manifold; and a second air filter assembly spaced away from the first air filter assembly and in fluidic communication with the intake manifold in parallel with the first air filter assembly, an inlet face of the first air filter assembly facing downward, and an inlet face of the second air filter assembly facing approximately horizontal and perpendicular to the inlet face of the first air filter assembly, where the first air filter assembly and the second air filter assembly do not share a common filter mount.

2. The intake system of claim 1, where the first air filter assembly includes a porous foam positioned upstream of a filter element.

3. The intake system of claim 2, where the porous foam is positioned vertically below the filter element, the porous foam and the filter element being of unequal size and shape.

4. The intake system of claim 2, where the porous foam spans a leading side of the filter element, the porous foam and the filter element comprising different materials.

5. The intake system of claim 1, where the first air filter assembly is in direct fluidic communication with a connector duct in direct fluidic communication with a filtered air compartment in the second air filter assembly, and where filtered air from the first air filter assembly merges with filtered air in the filtered air compartment in the second air filter assembly.

6. The intake system of claim 5, where the first air filter assembly is removably coupled to the connector duct.

7. The intake system of claim 6, where the first air filter assembly includes a protrusion mated with a recess included in a housing of the connector duct in a coupled configuration.

8. The intake system of claim 1, where the first air filter assembly has a smaller cross-sectional area than the second air filter assembly, and where the second air filter assembly includes an intake duct in direct fluidic communication with an unfiltered air compartment.

9. The intake system of claim 1, where the first air filter assembly is positioned external to an engine compartment and the second air filter assembly is positioned within the engine compartment.

10. The intake system of claim 1, where a vector normal to the inlet face of the first air filter assembly is not parallel with a vector normal to the inlet face of the second air filter assembly, and wherein the first air filter assembly and the second air filter assembly do not share a common housing and do not share a common housing body.

11. The intake system of claim 1, where the inlet face of the first air filter assembly is approximately parallel with a filter assembly in the first air filter assembly.

12. The intake system of claim 1, where the first air filter assembly is positioned adjacent to the second air filter assembly in an engine compartment.

13. A method for operation of an intake system for an engine comprising:

flowing intake air through a first air filter assembly including porous foam positioned upstream of a filter element, the first air filter assembly spaced away from a second air filter assembly having a filter of a different material than the first air filter and in fluidic communication with an intake manifold; and flowing filtered intake air from the first air filter assembly to the intake manifold, wherein the first air filter assembly and the second air filter assembly do not share a common housing, do not share a common housing body, and do not share a common filter mount, where the first air filter assembly is positioned external to an engine compartment, and where the second air filter assembly is positioned within the engine compartment.

14. The method of claim 13, further comprising flowing intake air through the second air filter assembly and flowing intake air from the second air filter assembly to the intake manifold.

15. The method of claim 13, where the filter element has a smaller cross-sectional area perpendicular to a direction of air flow through the filter element than a second filter element included in the second air filter assembly.

16. The method of claim 13, where flowing filtered intake air from the first air filter assembly to the intake manifold includes flowing filtered intake air from the first air filter assembly to a filtered air compartment in the second air filter assembly via a connector duct.

17. An intake system for an engine, comprising:

a first air filter assembly in fluidic communication with an intake manifold;

a second air filter assembly spaced away from the first air filter assembly and in fluidic communication with the intake manifold, an inlet face of the first air filter assembly facing downward, and an inlet face of the second air filter assembly facing approximately horizontal and perpendicular to the inlet face of the first air filter assembly;

a connector duct in direct fluidic communication with the first air filter assembly; and a filtered air compartment included in the second air filter assembly downstream of a filter element in the second air filter assembly, where the first air filter assembly and the second air filter assembly do not share a common filter mount.

18. The intake system of claim 16, where the first air filter includes a quick coupling apparatus having a protrusion sized to mate with a recess in a housing of the connector duct.

19. The intake system of claim 16, where the first air filter assembly includes a different material than the second air filter assembly.

20. The intake system of claim 16, where the first air filter assembly includes a porous foam positioned upstream of the filter element.

21. The intake system of claim 16, where the first air filter assembly is positioned adjacent to the second air filter assembly in an engine compartment.

* * * * *